Patented Jan. 5, 1932

1,839,961

UNITED STATES PATENT OFFICE

J BIRCHARD GREEN, OF CHICAGO, ILLINOIS, ASSIGNOR TO FRANKLIN M. WARDEN, OF CHICAGO, ILLINOIS

COATED FILLER AND PROCESS OF PRODUCING SAME

No Drawing.   Application filed May 14, 1928.   Serial No. 277,806.

This invention relates to improved coated filler material adapted to be utilized for arc welding and cutting and particularly relates to an improved coating for such material and a process for producing such a coating.

Much difficulty has been experienced in the past in obtaining satisfactory penetration and sound welds at the same time. Ordinary mild steel electrodes, coated or uncoated, do not give great penetration nor do they give sound welds free from blowholes at high current densities.

The object of this invention is to provide a welding rod yielding extreme penetration and sound welds at high current densities.

Another object of this invention is to provide a welding rod which will have sufficient penetration to produce welds in relatively thick parent metal without preparation by beveling.

A further object of this invention is to provide an improved dipping solution for coating filler material for arc welding and cutting.

A still further object of this invention is to provide an improved welding rod of the appreciable coating type.

The preferred process of the present invention comprises coating welding rods or other filler material by dipping the same in a solution-suspension containing a liquid such as water, an alkali metal carbonate in partial or total solution, an alkali earth metal carbonate in suspension and a binder. The alkali metal carbonate is preferably sodium hydrogen carbonate, the alkali earth metal carbonate is preferably commercial whiting or calcium carbonate and the binder is preferably dextrin or another organic material. The binder-water ratio is so regulated that the dipping solution will spread substantially evenly and uniformly over the rods to yield when dried an appreciable coating of the binder with its contained alkali and alkali earth carbonates. The coating should be sufficiently thick so as to overcome any irregularities in the weld-assisting properties of the surface of the metallic material but should not be so thick as to supersaturate the arc with non-metallic vapors and produce an objectionable slag in the weld. The dipping solution may be of such a consistency as to enable the rods to be dipped and dried en masse or in contact with surfaces without materially impairing the effectiveness and uniformity of the dried coating.

A dipping solution which may be utilized according to the process of this invention may be constituted as follows:

|  | By volume | By weight | Weight per cubic foot of final mixture |
|---|---|---|---|
|  | Parts | Parts | Lbs. per cu. ft. |
| Calcium carbonate | 30 | 29 | 40½ |
| Sodium carbonate | 15 | 12 | 16½ |
| Dextrine | 10 | 1 | 1½ |
| Water | 25 | 24 | 33½ |
| Total | 80 | 66 | 92 |

The whiting is preferably of commercial grade and may be dyed with a color or pigment such as yellow.

The above dipping solution is adapted to yield a surfacing coating upon the welding rods as contrasted to the much thinner inappreciable coating and the much thicker full flux and slag coatings.

The mixture may be varied in "by weight" proportions from 0.5 part to 5 parts of dextrin per 24 parts of water, from 20 to 40 parts of calcium carbonate per 24 parts of water and from 5 to 20 parts of sodium hydrogen carbonate to every 24 parts of water, but the preferred range is between 0.5 to 2 parts of dextrine, 10 to 15 parts of bicarbonate and 25 to 35 parts of calcium carbonate. The above specific formula is especially designed to be utilized with rods of $\frac{3}{16}''$ diameter or higher. For $\frac{5}{32}''$ rods and smaller it is usually preferable to use additional water, say about 10 to 30%, an average of 20% increase in the proportion of water. The coatings as specified above may be applied as flux or slag coating by increasing the concentration of the dipping solution. This latter procedure is especially desirable in the case of rods of $\frac{5}{16}''$ diameter or larger. In these cases, however, it is necessary to dip and dry the rods individually out of contact. In order to produce such slag or flux coatings, the amount of water in the dipping solution should be decreased by 25% to 75%.

The following is a specific method of processing rods with the above described dipping solution to which the invention is by no means restricted. Iron, mild steel or ferrous alloy rod ranging mostly from 1/8" to 5/16" in diameter was straightened and cut mostly to 14" lengths. The coating mixture or solution was placed in a suitable tank and about 50 pounds of electrodes were placed in a sling made of bar steel and dipped in the coating mixture which was thoroughly stirred before each new lot was dipped. The electrodes were then held above the tank for a few moments to allow the surplus liquid to drain off and they were finally dumped so as to scatter them in a mass over a nearby table top. A blast of warm air was continually blown over this top and the electrodes dried quickly.

The welding rods produced according to the process of this invention not only will be provided with an appreciable coating which will result in maximum efficiency in the arc welding and cutting processes but also will possess many other invaluable characteristics. They have extreme penetrating power and will produce sound welds at high current densities of between 1500 and 3600 amperes per square inch of cross sectional area of the rod. It is unnecessary to prepare the parent metal up to 1/2" thickness whereas with ordinary mild steel electrodes, coated or uncoated, 3/16" plate or heavier must be beveled. Welding is readily accomplished at between 20 and 30 feet of seam per hour upon half inch plate while 3 to 8 feet per hour is good practice with other electrodes. The electrode eliminates the ever present possibility of weld failure due to incomplete fusion and will give mild steel welds with a tensile strength of from 52,600# to 59,000# per square inch, the ordinary weld strength produced by other mild steel electrodes being between 5,000 and 10,000 lbs. per square inch less, due largely to the notched bar effect resulting from incomplete fusion.

A preferred electrode produced according to this invention may be defined as follows: A 1/4" rod coated in the above described manner is capable of fusing through a 1/2" mild steel plate using 640 amps. when the plates are placed tightly together and not beveled. At the same time it does not produce a bead on the top exceeding 3/16" in height. Other thicknesses of plate using rod sizes, currents and so forth, in proportion, give proportionate effects.

The welding rod of the present invention has a very high ratio of penetration to amount of welding rod consumed. Although the rod has a high linear speed, it is melted very slowly. It is difficult to define exactly these advantageous properties of the rod. Penetration in general varies directly as the quantity of heat available above the melting point of the parent or base metal. The penetrating qualities of the welding rod are usually approximately determined by observation of the depth of the crater while the welding deposit is being made. It is impossible to determine the penetrating qualities of the welding rod in recognized units. The present rod not only enables the production of a sound weld free of blowholes but also enables complete fusion of the joint. In the usual joints prepared by beveling, it is necessary to be careful that the bottom of the bevel is not fused since this will usually leave a cavity very difficult to fill up. As a result the bottom of the joint is usually not welded together leaving a slight notch which will decrease the strength of the joint. The rod of the present invention has sufficient power to enable complete fusion of the joint and as a result the welded joints will have 15% to 25% greater strength.

The reasons for the high penetrating and linear speed qualities of the rod of the present invention are not exactly certain, but they appear to be due in substantial measure to the character of the coating. The preferred dried coating is a mixture or combination of dextrine, bicarbonate of soda and calcium carbonate, all of which have weld-assisting properties. This mixture appears to most effectively transfer the largest part of the heat generated by the arc to the junction of the arc and the work when the work is used as a positive terminal in direct current. It is possible that the advantages of the present coating are due to its thermocouple action. It appears that a thermocouple is set up at the junction of the rod and the arc and at the junction of the arc and the work. When the main current coincides with the direction of the thermocouple, the heat production will not be so great, while if they are in the opposite directions, the heat production will be greatly increased. The combination of dextrine, bicarbonate of soda and calcium carbonate appear to control these thermocouple actions so that maximum heat production takes place at the work when the work is the positive terminal in direct current. Dextrine may be replaced by other similar substances producing large quantities of carbonaceous gases especially organic compounds, but dextrine is preferred. The dextrine also functions as a binder. In the use of substances such as dextrine which readily decompose at the heat of the arc, it is usually necessary to utilize some other material which will carry the materials of the coating into the fusion zone. Bicarbonate of soda performs this function, but if desired may be replaced, in part or in whole, by other alkali metal hydroxides, carbonates and metallates such as sodium aluminate. These materials in general tend to become pasty and sticky as they approach the fusion zone. The calcium carbonate or whiting has marked weld-assisting properties but may be replaced in whole or in part by other alkali earth metal compounds.

Other welding rods do not possess these desirable properties nor this penetrating power. If such rods are held in one spot long enough to burn or fuse through and produce a drip, so much filler material is melted that either the bead will be higher than ¼″ or the metal will be splashed to the sides. On the other hand, if high current densities of the order of 1500 or 3600 amperes per square inch are utilized, the welding rod will be melted very rapidly, and numerous blowholes will be produced in the weld.

The coated rods of ¼″ diameter or lighter, produced according to this invention, have about the same character of thickness and appreciability of coating as do the coated rods disclosed in the co-pending applications, Serial No. 96,064 filed March 19, 1926 and Serial No. 171,734 filed February 28, 1927. The present application is a continuation in part of these two applications and is particularly directed to an improvement in the character and consistency of the dipping bath disclosed in said applications.

What is claimed is:

1. A process of coating a filler material for arc welding and cutting which comprises dipping said filler material in a solution containing calcium carbonate, sodium bicarbonate, dextrine and water in the proportions of about 30 parts by weight of calcium carbonate, 10 parts by weight of sodium bicarbonate, 1 part by weight of dextrine and 20 parts by weight of water.

2. A process of coating a filler material for arc welding and cutting which comprises dipping said filler material in a solution containing calcium carbonate, sodium bicarbonate, dextrine and water in the proportions of about 30 parts by volume of calcium carbonate, about 15 parts by volume of sodium bicarbonate, about 10 parts by volume of dextrine and about 25 parts by volume of water.

3. A welding rod provided with an appreciable coating containing dextrine, an alkali metal carbonate and an alkali earth metal carbonate, in the proportion of about 0.5 to 5.0 parts of the dextrine, about 5 to 20 parts by weight of the alkali metal carbonate and about 20 to 40 parts by weight of the alkali earth metal carbonate.

4. A welding rod provided with a full flux coating containing dextrine, sodium carbonate and calcium carbonate, in the proportion of about 0.5 to 5.0 parts of the dextrine, about 5 to 20 parts by weight of the sodium carbonate and about 20 to 40 parts by weight of the calcium carbonate.

5. A welding rod provided with a full flux coating containing dextrine, sodium carbonate and calcium carbonate, in the proportion of about 1 part of the dextrine, about 10 parts by weight of the sodium carbonate and about 30 parts by weight of the calcium carbonate.

In testimony whereof I have hereunto subscribed my name.

J BIRCHARD GREEN.